Patented Apr. 20, 1937

2,077,481

UNITED STATES PATENT OFFICE 2,077,481

TRANSPARENT PHOSPHATE GLASS

Paul Huppert, Mannheim, and Hans Wolff, Ludwigshafen-on-the-Rhine, Germany, assignors to I. G. Farbenindustrie Aktiengesellschaft, Frankfort-on-the-Main, Germany No Drawing. Application July 18, 1934, Serial No. 735,818. In Germany August 15, 1933

2 Claims. (Cl. 106—36.1)

The present invention relates to new phosphate glasses and a process of producing same.

Almost all of the glass permeable to ultra-violet light hitherto known has the objection that during its irradiation, especially with strong ultra-violet rays, alterations are gradually caused within the glass which become chiefly noticeable in a reduction of its permeability to ultra-violet light. This diminution in permeability to ultra-violet light is termed "solarization".

We have now found that glass having an excellent permeability to ultra-violet light similar to that of quartz and exhibiting an almost complete freedom from solarization is obtained by introducing ammonium salts into the usual phosphate glass mixture, especially by using ammonium phosphate wholly or partly for the introduction of the phosphoric acid. Primary, secondary or tertiary ammonium phosphate may be employed. Other suitable ammonium salts are for example those the anion of which is volatile during the fusion, such as ammonium carbonate or ammonium nitrate. The glass mixture should have such a composition that the finished glass contains at least 10 per cent of $P_2O_5$; the remaining constituents may be alkalies, alkaline earths, magnesium oxide, zinc oxide, aluminium oxide, silica, boric anhydride, and other compounds which do not injuriously affect the permeability to ultra-violet light. The production of the phosphatic glasses is otherwise carried out in the usual manner by melting together compounds yielding the oxides enumerated above.

In order to obtain glass free from bubbles it is preferable to add oxidizing agents to the glass mixture, especially solid oxidizing agents, for example alkali metal nitrates, aluminium nitrate or barium peroxide. In this manner glass entirely free from bubbles is obtained within the normal fusion period.

Care should be taken that impurities, such as iron oxide, titanium oxide or lead oxide, are excluded as far as possible by employing correspondingly pure raw materials, by employing pure crucible material and by keeping any flying dust away from the melt.

The following examples will further illustrate the nature of this invention but the invention is not restricted to these examples. The parts are by weight.

Example 1

A glass mixture of 13.77 parts of potassium carbonate, 6.71 parts of potassium nitrate, 8.93 parts of calcium carbonate, 3.22 parts of barium carbonate, 18.53 parts of 84.7 per cent magnesium carbonate, 31.04 parts of boric acid, 28.80 parts of aluminium oxide and 48.70 parts of secondary ammonium phosphate is fused at about 1300° C. in a quartz crucible. A glass permeable to ultra-violet light and stable to irradiation is obtained having the following composition of glass-forming oxides:—

| | Per cent by weight |
|---|---|
| $K_2O$ | 12.5 |
| $CaO$ | 5.0 |
| $BaO$ | 2.5 |
| $MgO$ | 7.5 |
| $B_2O_3$ | 17.5 |
| $Al_2O_3$ | 28.8 |
| $P_2O_5$ | 26.2 |

Example 2

A mixture of 2.29 parts of sodium carbonate ($Na_2CO_3.2H_2O$), 34.60 parts of magnesium carbonate (84.7 per cent purity), 35.45 parts of boric acid, 10.00 parts of silica, 23.78 parts of aluminium oxide, 58.30 parts of aluminium nitrate ($Al(NO_3)_3.9H_2O$) and 43.30 parts of secondary ammonium phosphate is fused at about 1400° C. in a quartz crucible. A glass having the following composition of glass-forming oxides is obtained:—

| | Per cent by weight |
|---|---|
| $Na_2O$ | 1.0 |
| $MgO$ | 14.0 |
| $B_2O_3$ | 20.0 |
| $SiO_2$ | 10.0 |
| $Al_2O_3$ | 31.7 |
| $P_2O_5$ | 23.3 |

The permeability of this glass to ultra-violet light and its stability to irradiation are similar to those of the glass obtained according to Example 1.

Example 3

A mixture of 5.4 parts of aluminium oxide, 4.3 parts of magnesium oxide, 13.5 parts of barium carbonate, 148.4 parts of secondary ammonium phosphate and 30.6 parts of nitric acid having a specific gravity of 1.4 is fused at about 1200° C. in a quartz crucible. A glass having a good permeability to ultra-violet light and a good stability to irradiation is obtained. Its composition of glass-forming oxides is as follows:—

| | Per cent by weight |
|---|---|
| $Al_2O_3$ | 5.4 |
| $MgO$ | 4.3 |
| $BaO$ | 10.5 |
| $P_2O_5$ | 79.8 |

What we claim is:—

1. Transparent phosphate glasses having an excellent permeability to ultra-violet light similar to that of quartz and being almost completely free from solarization obtained by the addition of ammonium phosphate to the usual batches of transparent phosphate glasses.

2. The process of producing transparent phosphate glasses which comprises melting a batch suitable for producing transparent phosphate glasses containing an addition of ammonium phosphate.

PAUL HUPPERT.
HANS WOLFF.